US006953196B1

(12) United States Patent
Huang

(10) Patent No.: US 6,953,196 B1
(45) Date of Patent: Oct. 11, 2005

(54) NON-INFLATION ADAPTER FOR PROMPT ENGAGEMENT WITH A SHANK OF A SCREW DRIVER AND A HANDLE

(76) Inventor: Daniel Huang, P.O. Box 697, Feng-Yuan City, Taichung Hsien (TW) 420

( * ) Notice: Subject to any disclaimer, the term of this patent is extended or adjusted under 35 U.S.C. 154(b) by 221 days.

(21) Appl. No.: 10/401,989

(22) Filed: Mar. 31, 2003

(51) Int. Cl.[7] .......................................... B23B 31/107
(52) U.S. Cl. ...................... 279/75; 279/155; 279/906; 81/177.85
(58) Field of Search ............................. 279/75, 22, 30, 279/155, 906; 81/177.85

(56) References Cited

U.S. PATENT DOCUMENTS

| | | | | |
|---|---|---|---|---|
| 3,658,351 | A | * | 4/1972 | Benjamin et al. .............. 279/75 |
| 3,788,658 | A | * | 1/1974 | Benjamin et al. .............. 279/75 |
| 5,062,749 | A | * | 11/1991 | Sheets ........................... 279/75 |
| 5,222,956 | A | * | 6/1993 | Waldron ....................... 606/80 |
| 5,398,946 | A | * | 3/1995 | Quiring ........................ 279/30 |
| 6,199,872 | B1 | * | 3/2001 | Hasan .......................... 279/30 |
| 6,270,085 | B1 | * | 8/2001 | Chen et al. .................... 279/22 |
| 6,325,393 | B1 | * | 12/2001 | Chen et al. .................... 279/22 |
| 6,637,755 | B2 | * | 10/2003 | Chen et al. .................... 279/22 |
| 2004/0026878 | A1 | * | 2/2004 | Chen et al. .................... 279/75 |
| 2004/0164503 | A1 | * | 8/2004 | Fan-Chiang et al. .......... 279/75 |

* cited by examiner

Primary Examiner—Derris H. Banks
Assistant Examiner—Ali Abdelwahed

(57) ABSTRACT

An adapter for prompt engagement a shank of screw driver with a handle includes a tubular adapter connected with a handle, a polygonal central bore having a reduced bottom, a concaved front outer periphery to define a shoulder thereunder, a plurality of conical through holes around a middle peripheral wall for respectively disposing a plurality of steel balls, a conical spring disposed into the central bore having a large thick upper portion blocking the conical through holes and a small incompact lower portion fixed in the reduced bottom, an annular sleeve with an annular convex on middle inner periphery slidably wrapped on the adapter biased by a circular spring on the shoulder, an annular cap fixed on the top of the adapter with a circular ring engaged therebetween, a receiving space for receiving the steel balls and a polygonal shank of in the bore is held by the steel balls.

7 Claims, 7 Drawing Sheets

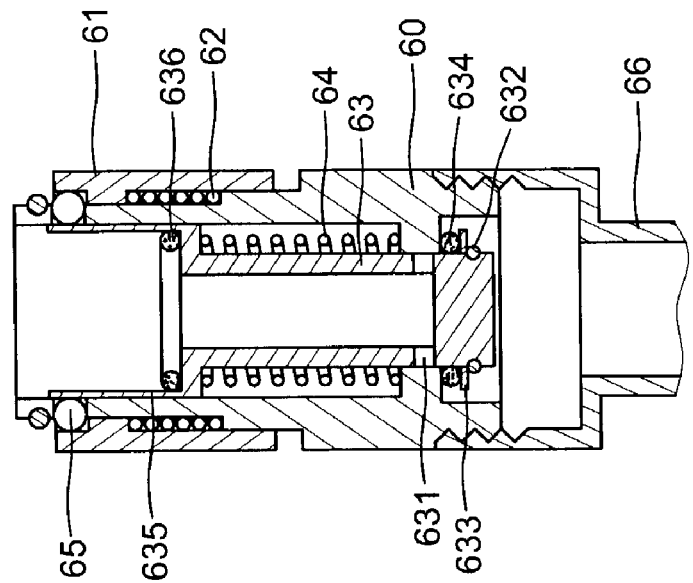
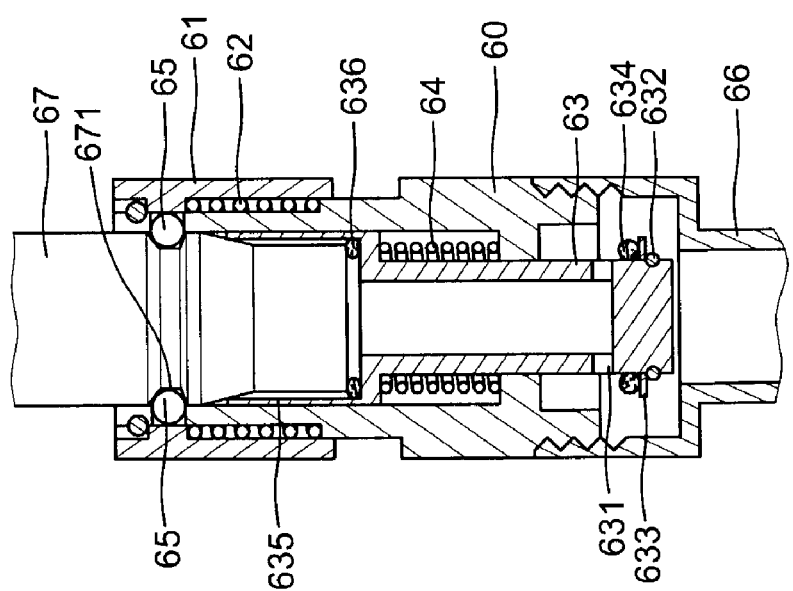

NON-INFLATION ADAPTER FOR PROMPT ENGAGEMENT WITH A SHANK OF A SCREW DRIVER AND A HANDLE

BACKGROUND OF THE INVENTION

The present invention relates to screw drivers and more particularly to an adapter for prompt engagement a shank of screw driver with a handle into which the shank of the screw driver is readily engaged.

A prior art adapter 10 (as shown FIGS. 1, 2 and 3) which has a rear end connected to a handle (not shown), a polygonal central bore 101 in the front end, a concaved outer periphery 11 wrapped with a spring 12, a plurality of conical through holes 13 spacedly formed around a central portion of the concaved periphery for respectively disposing a plurality steel ball 14 therein, an annular sleeve 15 slidably sleeved on the concaved outer periphery 11 having an annular convex 17 biased by the spring 12 including a sloped upper surface and a receiving space 16 above the sloped upper surface to receiving the steel balls 14 when they move outward. A polygonal shank 1 of a screw driver has a plurality of the semi-circular grooves 3 spacedly formed around a middle periphery respectively engageable with the steel balls 14. The annular convex 17 is normally stopped against the steel ball 14 to prevent them from moving outward (as shown in FIG. 1). When the shank 1 inserts into the central bore 101. The user has to grip the hand with one hand and use the fingers of that hand to pull the sleeve 15 rearward to permit the steel balls 14 moving into the receiving space 16 and uses the other hand to insert the shank 1 into the central bore 101 of the adapter 10. So that the shank 1 can be able to freely slide in the central bore 101 (as shown in FIG. 2). When the shank 1 is inserted in place into the central bore 101, the user can release the sleeve 15 and the annular convex 17 biased by the spring 12 moves upward to force the steel balls 14 moving inside to respectively engaged within the semi-circular grooves 3 of the shank 1 (as shown in FIG. 3). This type of adapter 10 gives great inconvenience to user because the user has to use one hand to the synchronously perform two actions.

Another adapter (as shown in FIGS. 4 and 5) is of a pneumatically tool adapter 60 which has a hollow interior tubular body, a stepped outer periphery, an annular sleeve 61 wrapped on the front portion of the tubular body biased by a first spring 62, a resistant member 63 inside the central bore of the tubular body biased by a second spring 64 and having plurality of air vents 631 spacedly formed in the bottom, a steel ring 632, an annular cushion 633 and a steel ring 634 under the air vents 631, a cylinder wall 635 and a press ring on the top of the resistant member 63, a plurality of steel balls 65 spacedly disposed in side a plurality of through holes in the peripheral wall of the tubular body and mutually stopped by the cylinder wall 635 and the sleeve 61 and an air pipe 66 connected to the rear end of the tubular body for supplying the high pressure air into the tubular body, in use, don't have to move the sleeve 61 but just insert the lower end of a air pipe 67 of a pneumatic tool into the central bore of the tubular body to press the resistant member downward until the annular groove 671 of the air pipe reached to the steel balls 65 which are pressed by the sleeve 61 will automatically engage into the annular groove 671 therefore to arrest the air pipe 67. This arrangement is very skillfully and convenient, but don't suitable to engage a shank of a screwdriver.

Still another prior art adapter 70 (as shown in FIG. 6) comprises a hollow interior tubular body having a central bore 71, an annular sleeve 72 slidably wrapped on the concaved outer periphery of the tubular body, a plurality of conical through holes 74 spacedly formed in the concaved outer periphery for respectively disposed a plurality of steel balls 75 therein, a roughly inverse U-shaped cap 76 slidably disposed into the central bore 71 having a pair of transverse ends 761 stopped against a pair of shoulders 701 in the central bore 71, a spring 77 biased the inverse U-shaped cap 76 having a lower end stopped against the top of an inverse U-shaped bottom 78, which is connected to the inner periphery of the tubular body by punching. In use, directly insert a shank of a screw driver into the central bore 71 to press the inverse U-shaped cap 76 moving downward. When the groove of the shank reaches to the still balls 75 they will automatically engaged into the groove of the shank under the pressure of the sleeve 72. The shank of the screw driver is therefore fixed in the central bore 71. This type of adapter is more convenient than the others. However, it has at least the following disadvantages:

a) the resilient force of the spring 77 is too strong, when inserts the shank into the central bore 71, it may be rebound out to hurt people, b) it requires more parts, the assembly of the parts is complicated and cost more, c) the inverse U-shaped member 78 is not integrated with the tubular body but is punched to connect the tubular body, so the torque is therefore weak, d) the lower end of the spring 77 is freely disposed on the top of the inverse U-shaped member 78, it may be inclined toward one side and deformed that affect its resilient force, and e) the central bore 71 has an enlarged bottom that affect its intensity.

SUMMARY OF THE PRESENT INVENTION

The present invention has a main object to provide an adapter for prompt engagement a shank of screw driver with a handle into which the shank of a screw driver is readily to engaged without application of the sleeve. It is convenient and don't have to use one hand to perform two actions synchronously.

Another object of the present invention is to provide an adapter for prompt engagement a shank of screw driver with a handle which is structurally integrated and readily to assemble to promote the torque force.

Still another object of the present invention is to provide an adapter for prompt engagement a shank of screw driver with a handle from which the shank rebounds out will temporarily stopped in the rim of the central bore without hurting people.

Further object of the present invention is to provide an adapter for prompt engagement a shank of screw driver with a handle in which the central bore has a larger upper portion and a small bottom portion for stably disposing the lower end of the spring which stretches to a certain height to stop against the steel balls without using a cylinder wall.

Accordingly, the adapter for prompt engagement a shank of screw driver with a handle comprises generally a hollow interior tubular body having a concaved upper outer periphery, a plurality of conical through holes spacedly formed around a middle portion of the concaved outer periphery for the engagement of a plurality of steel balls respectively, a polygonal central bore in the body including a reduced bottom, a cone shaped spring disposed in to the central bore having a large thick upper portion stopped against the steel balls to prevent the steel bolls from moving into the central bore and a small incompact lower portion engaged into the reduced bottom of the central bore, an annular sleeve slidably wrapped on the outer periphery of the body having an annular convex on inner periphery biased by a spring to stopped against the steel balls and to prevent the steel balls from moving outward and an annular cap connected to the top of the body with a circular ring engaged therebetween. When a polygonal shank of a screw driver inserts into the central bore, the large thick upper portion of the spring is pressed down to permit the steel balls to engage into the groove of the shank under the pressure of the annular convex. The shank is therefore fixed in the central bore. When removes the shank out of the central bore, it will be rebound by the cane shaped spring and temporarily stopped on the circular ring without hurting people. Beside the torque force is larger than the above prior art due to the structural integration.

The present invention will become more fully understood by reference to the following detailed description thereof when read in conjunction with the attached drawings.

BRIEF DESCRIPTION OF THE DRAWINGS

FIGS. 4 and 5 are the sectional views of a pneumatic adapter according another prior art.

DETAILED DESCRIPTION OF THE PREFERRED EMBODIMENT

Figure 1:
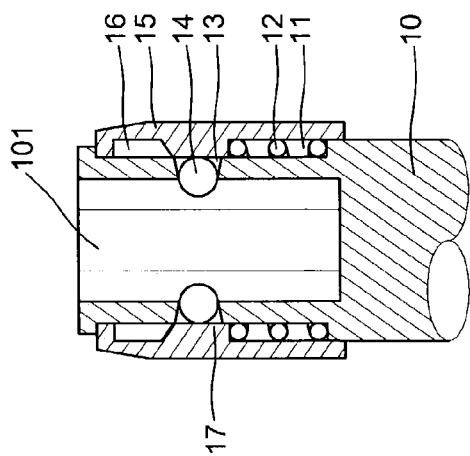
FIGS. 1 to 3 are the sectional views of an adapter according to a prior art.
Figure 2:
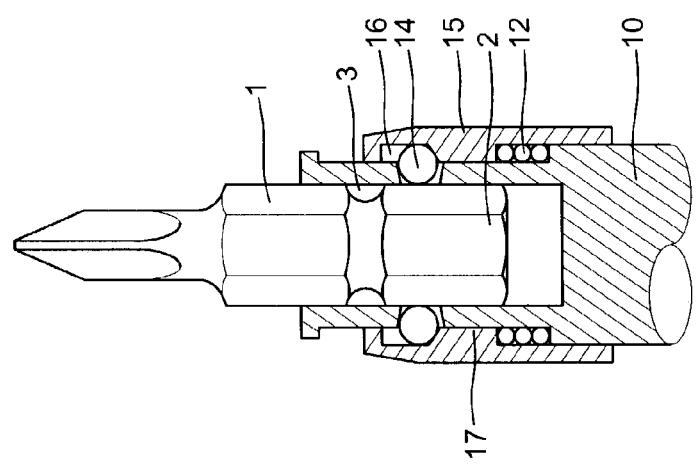
Figure 3:
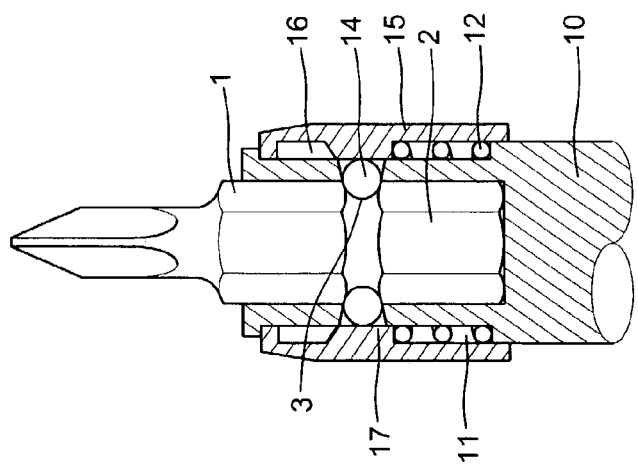
Figure 6:
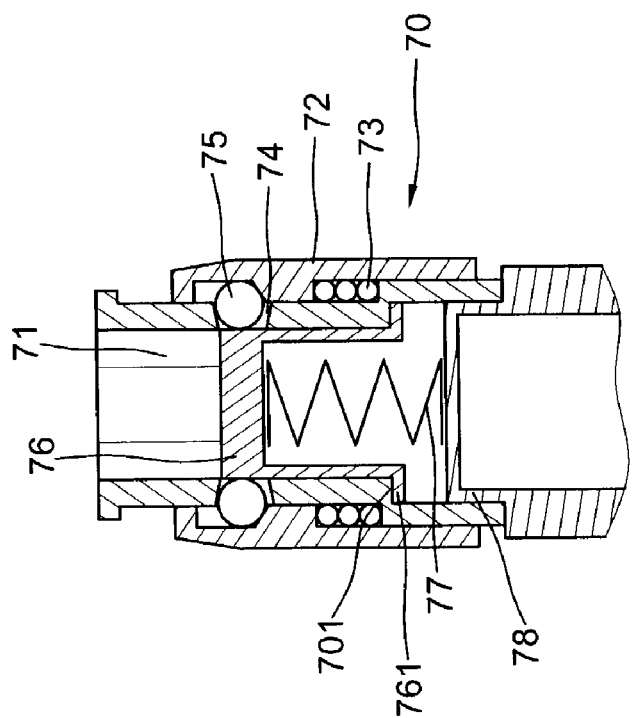
FIG. 6 is a sectional view of still another adapter according a prior art.
Figure 7:
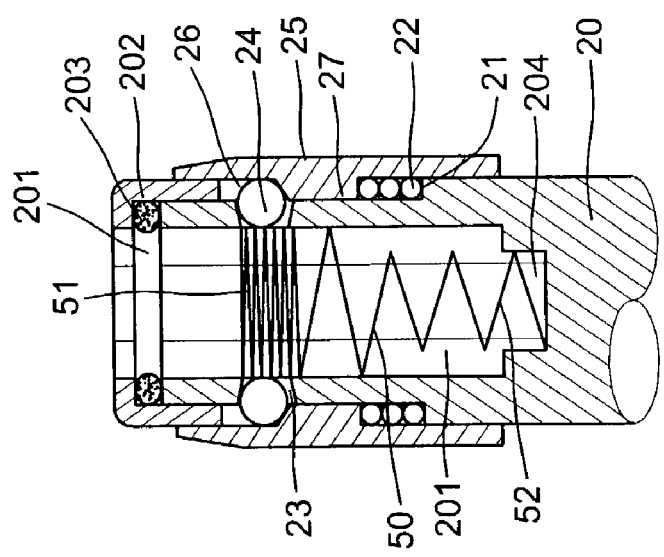
FIG. 7 is a sectional view to show a first embodiment of the adapter according to the present invention.
Figure 8:
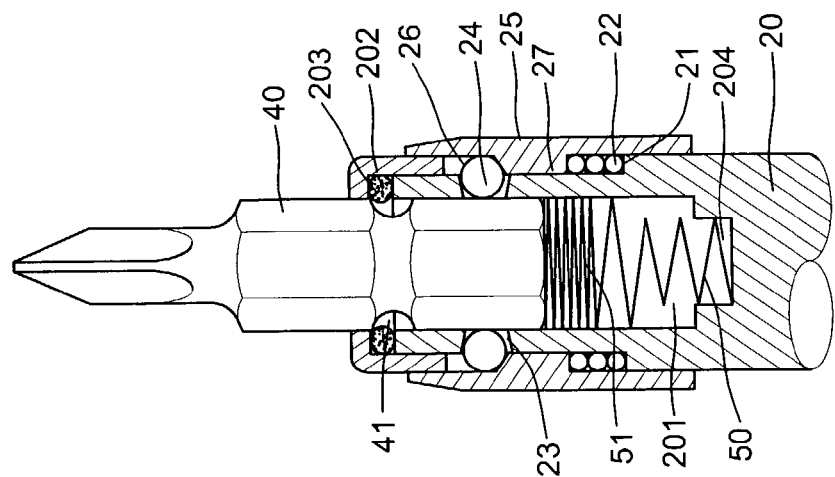
FIG. 8 is a sectional view to show that a shank of a screw driver is begun to insert into the central bore.
Figure 9:
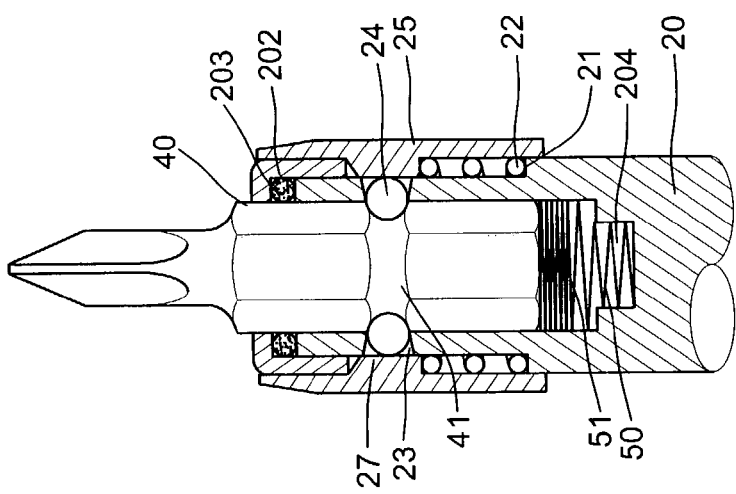
FIG. 9 is a sectional view to show that the shank of a screw driver is inserted in place into the central bore.

As illustrated in FIGS. 7, 8 and 9 of the drawings, the first embodiment of the an adapter for prompt engagement a shank of screw driver with a handle of the present invention comprises a hollow interior tubular adapter 20 which has a rear end enabling to connected a handle (not shown), a concaved front outer periphery defined a shoulder 21, a plurality of conical through holes 23 spacedly formed around a middle peripheral wall of the concaved front out periphery for respectively disposing a plurality of steel balls 24, an annular sleeve 25 slidably wrapped on the concaved front outer periphery including an annular convex 27 on a middle inner periphery thereof biased by a spring means 22 and having a sloped upper surface, a polygonal central bore 201 including a reduced bottom 204, a conical spring 50 disposed into the polygonal central bore 201 including a thick larger upper portion 51 at a position preventing the steel balls from entered into the central bore 201 and an incompact small lower portion 52 held in the reduced bottom 204 of the central bore 201, an annular cap 202 fixed to the top of the adapter 20 with a circular ring 203 engaged therebetween and a receiving space 26 defined between the lower end of the cap 202 and the sloped upper surface of the annular convex 27 for receiving the steel balls 24 when they move outward. The annular cap 202 has a function to prevent the annular sleeve 25 from ejecting out of the adapter under the resilience of the spring 22. A polygonal shank 40 of a screw driver has an annular groove 41 in a middle outer periphery made engageable with steel balls 24.

Figure 10:
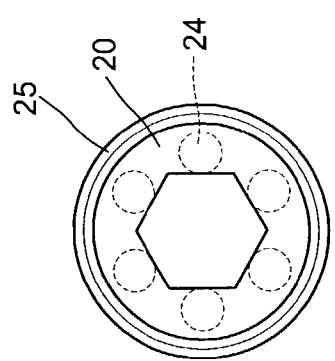
FIG. 10 is a top view of FIG. 7 to show the location of the central bore and the steel balls.

Based on the aforediscussed structure, when inserts the shank 40 into the central bore 201, the conical spring 50 is pressed to retreat downward (as shown in FIG. 8) and when the shank 40 is inserted in place into the central bore 201, the sleeve 25 under the resilience of the spring 22 to slide upward and its annular convex 27 to squeeze the steel balls 24 moving inward to engage within the groove 41 of the shank 40 (as shown in FIGS. 9 and 10). The process of the engagement of the shank 40 into the adapter 20 is very simple and convenient. The user just grips the handle with one hand and to insert the shank 40 with other hand. The engagement of the shank 40 into the adapter 20 is therefore achieved. Without using one hand to grip the handle and synchronously using the fingers of the same hand to pull the sleeve 25 downward. It also prevents erred actions. When removes the shank 40 out of the adapter 20, the user just pulls the sleeve 25 downward to let the steel balls 24 to be entered into the receiving space 26, and the shank under the resilience of the conical spring will be automatically ejected outward. But it first stops at the circular ring 203 (as shown in FIG. 8) before pulled out of the adapter 20. This arrangement aims to prevent the shank 40 from directly ejecting out to hurt people.

Figure 11:
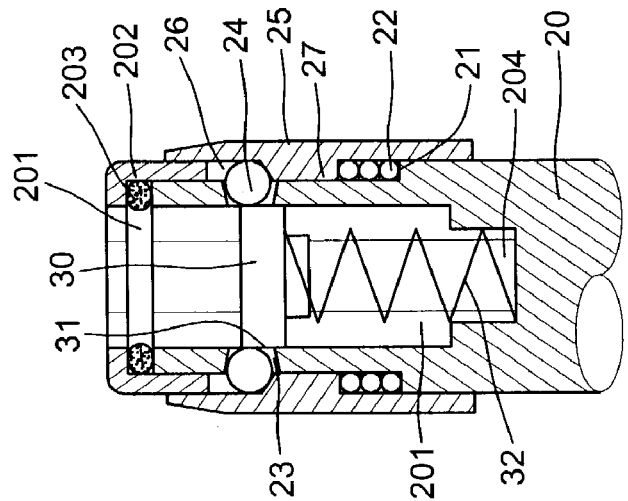
FIG. 11 is a sectional view to show a second embodiment of the adapter of the present invention.
Figure 12:
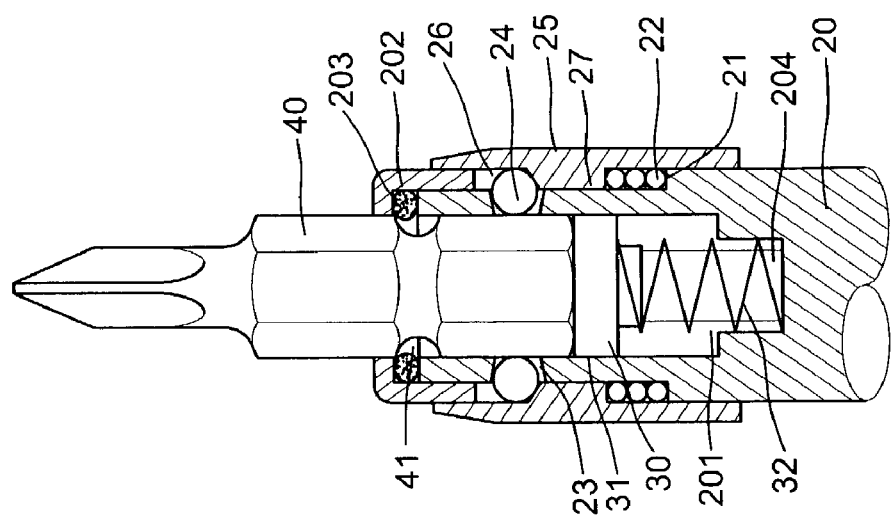
FIG. 12 is a sectional view to show that the shank of a screw driver is begun to insert into the central bore.
Figure 13:
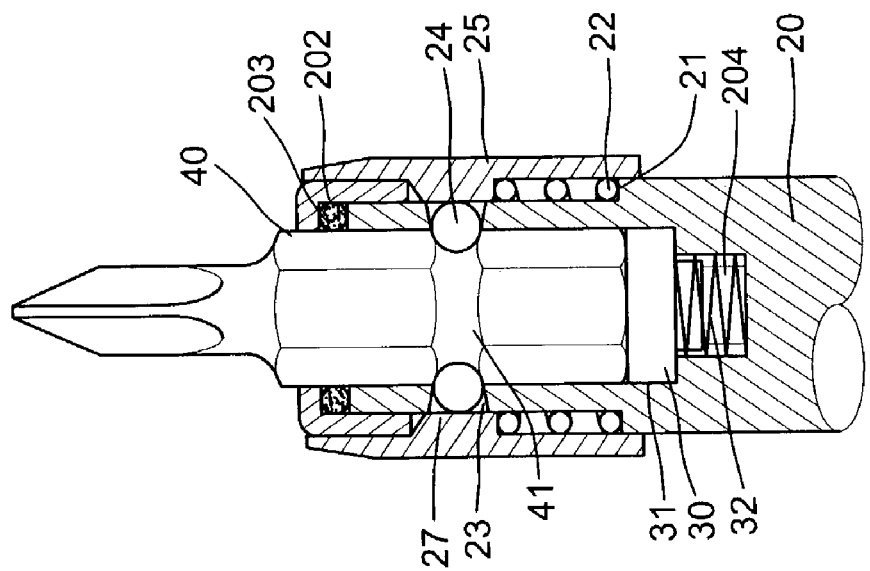
FIG. 13 is a sectional view to show that the shank of a screw driver is inserted in plate into the central bore.

Referring to FIGS. 11 and 12, a second embodiment of the adapter 20 of the present invention is provided. This embodiment is structurally and functionally most similar to that of the first embodiment and the above discussions are applicable in the most instances. The only modification is that the conical spring 50 is now removed and instead of is a stopper 30 of roughly T-shaped section having a circular body normally positioned at the inside of the conical through holes 23 to prevent the steel balls form entering into the polygonal central bore 201 and a circular projection centrally projected downward from the underside thereof biased by a spring 32 which has a lower end fixed into the reduced bottom 204 of the central bore 201. The operation of inserting and/or removing the shank 40 from the central bore 201 is the same as discussed in the first embodiment. FIG. 13 shown that the shank 40 is already engaged in place into the adapter 20 while the spring 32 is totally retreated into the reduced bottom 204 of the central bore 201.

Figure 14:
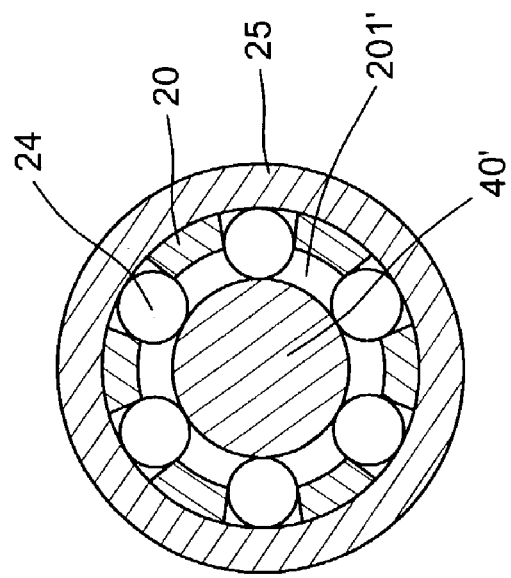
FIG. 14 is a top sectional view to show a cylindrical central bore in the adapter.

FIG. 14 shows that the central bore 201 can be change into a cylindrical shape 201' in order to serve for a cylindrical shank 40'.

Figure 15:
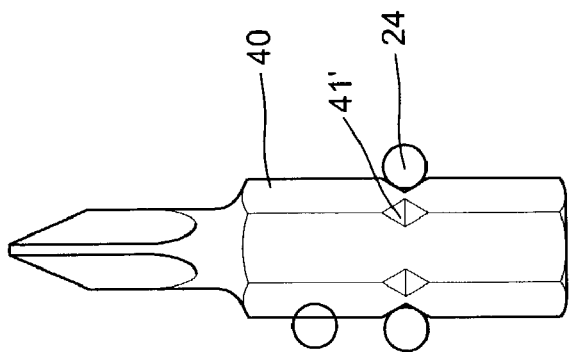
FIG. 15 is a plane view to show that the rhombic grooves in the outer periphery of the shank.
Figure 16:
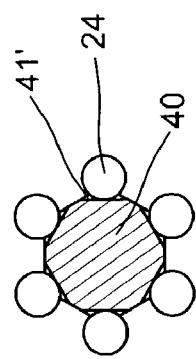
FIG. 16 is a to sectional view to show the steel balls engaged into the triangular grooves.

FIGS. 15 and 16 show that the annular groove 41 in the polygonal shank 40 can be changed into a plurality of rhombic shaped grooves 41' around outer periphery of the shank 40 which can be also held by the steel balls 24.

Figure 17:
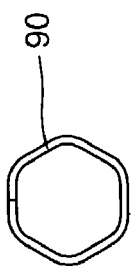
FIG. 17 is a top view to show a polygonal spring used in the adapter of the present invention.

FIG. 17 shows a polygonal spring means 90 which is more suitable to disposed into the polygonal central bore than the cylindrical shaped spring means.

The adapter 20 of the present invention has the features set forth as follows:

a) the adapter is integrative so as to intensify the torque force, b) the reduced bottom 204 of the central bore 201 can fixedly position the lower end of the springs 50 and/or 32 which ensure the springs 50 and/or 32 not to be break off or inclined to one side to affect their resilient force, c) the conical spring 50 and the stopper 30 can effectively stop the steel balls 24 without using any other parts, d) decrease the manufacture process, readily to assemble the parts, reliable operation and eliminating the erred actions, e) a circular ring 203 in the rim of the central bore 101 can temporarily hold the shank 40 in order to prevent the shank directly ejected out of the central bore 101 to hurt people.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. An adapter for prompt engagement with a shank of a screw driver with a handle comprising:

a hollow interior tubular adapter having a rear end enabling said adapter to connect to a handle, a polygonal central bore in a front end thereof which has a reduced bottom, a concaved front outer periphery to define a shoulder thereunder, a plurality of conical through holes spacedly formed around a middle peripheral wall of said concaved front outer periphery for respectively disposing a plurality of steel balls therein, a conical spring disposed into said polygonal central bore having a large thick upper portion positioned at inner side of said conical through holes for preventing said steel balls from entering into said central bore and a small incompact lower portion fixed into the reduced bottom of said central bore, an annular sleeve with an annular convex on a middle inner periphery slidably wrapped on outer periphery of said adapter wherein said annular convex is biased by a circular spring on said shoulder and said annular convex has a sloped upper surface engageable with said steel balls, an annular cap fixed a to top of said adapter with a circular ring engaged therebetween and a receiving space defined between lower end of said annular cap and the sloped upper surface of said annular convex for receiving said steel balls;

a polygonal shank of a screw driver insertable into said polygonal central bore having an annular groove in a middle outer periphery engageable with said steel balls.

2. The adapter as recited in claim 1 wherein said central bore may be cylindrical to serve for a cylindrical shank.

3. The adapter as recited in claim 1 wherein said polygonal shank has a plurality of rhombic shaped grooves spacedly formed in a middle outer periphery engageable with said steel balls respectively.

4. The adapter as recited in claim 1 wherein said conical spring is a polygonal shape.

5. An adapter for prompt engagement with a shank of a screw driver with a handle comprising:

a hollow interior tubular adapter having a rear end enabling, said adapter to connect with a handle, a polygonal central bore in a front end including a reduced bottom, a concaved front outer periphery to define a shoulder thereunder, a plurality of conical through holes spacedly formed around a middle peripheral wall of said concaved front outer periphery for respectively disposing a plurality of steel balls therein, a stopper of T-shaped section disposed into said polygonal central bore having a circular body normally positioned at inner side of said conical through holes to prevent said steel balls from entering into said polygonal central bore and a circular projection centrally projected downward from underside thereof biased by a first spring which has a lower end fixed into the reduced bottom of said central bore, an annular sleeve with an annular convex on a middle inner periphery wrapped on outer periphery of said adapter, wherein said annular convex is biased by a circular spring on said shoulder and has a sloped upper surface engageable with said steel balls, an annular cap fixed to top of said adapter with a circular ring engaged therebetween and a receiving space defined between lower end of said annular cap and the sloped upper surface of said annular convex for receiving said steel balls;

a polygonal shank of a screw driver insertable into said polygonal central bore having an annular groove in a middle outer periphery engageable with said steel balls.

6. The adapter as cited in claim 5 wherein said central bore is cylindrical to serve for a cylindrical shank.

7. The adapter as recited in claim 5 wherein said polygonal shank has a plurality rhombic shaped grooves spacedly formed in a middle outer periphery engageable with said steel balls respectively.

* * * * *